Patented June 10, 1941

2,244,968

UNITED STATES PATENT OFFICE 2,244,968

METHOD OF OXIDIZING STEROLIC COMPOUNDS AND PRODUCTS OBTAINED THEREBY

Erwin Schwenk, Montclair, N. J., and Bradley Whitman, New York, N. Y., assignors to Schering Corporation, Bloomfield, N. J., a corporation of New Jersey No Drawing. Application March 5, 1937, Serial No. 129,222

22 Claims. (Cl. 260—397.4)

The present invention relates to the production of degradation products having the cyclopentano polyhydro phenanthrene nucleus by the oxidation of sterols of various kinds, and more particularly to an improved method of oxidizing such compounds whereby higher yields of the desired end product are secured, while at the same time valuable by-products in larger quantities than heretofore are obtained.

In the past few years, Ruzicka and co-workers, Fernholz, Butenandt and others, have described the oxidation of cholesterol with chromic acid as the oxidant, whereby the side chain of the cholesterol is cut off and replaced by a keto group in the molecule. Thus the preparation of androsterone from epi-dihydro cholestrol, dehydroandrosterone from dibromo cholesterol acetate, etc. have been described. The method consists generally in the treatment of an acetic acid solution of the starting material with an acetic acid solution of chromic acid which usually contains a small amount of water. The yields which have been published by some of the aforementioned authors are extremely low. It is possible to increase these yields somewhat by adding the chromic acid over a long period of time, to prevent the large excess of chromic acid which must be used from destroying a large part of the starting material and thereby lowering the yield. For the technical use of this reaction the low yields and the necessity for conducting the oxidation over such long periods of time are serious handicaps.

We have found that a much faster and more selective oxidation can be carried out and that the yields are increased considerably if the oxidation is carried out in the presence of a suitable amount of free sulfuric acid. It is then possible to work at a still lower temperature and to obtain much larger yields than in the methods previously employed. In other words, a relatively rapid rate of oxidation can be secured in accordance with the invention without the necessity for external heating, while at the same time undesirable side reactions are reduced or repressed.

A very important advantage of our method is that the amount of valuable by-products which can be isolated from the reaction mixture is also greatly increased. These by-products are very suitable starting materials for the preparation of the corpus luteum hormone, progesterone. In using our new method, the amount of the Δ 5.6 cholenic acid is increased several times over that obtained by known processes, while of the ketones which accompany the dehydroandrosterone in the oxidation mixture, a large part is pregnenolone which, by a simple dehydrogenation, can be converted into progesterone. The method for working up is as follows:

Example 1

2.46 kg. of cholesterol are dissolved in 1.8 liters of acetic anhydride and boiled gently for 2 hours. The solution is then poured into 125 liters of glacial acetic acid contained in a large stirring kettle. This solution is cooled down to 15° C. and the calculated amount of bromine dissolved in 4 liters of acetic acid is added slowly under stirring. After the addition of the bromine, and hence the saturation of the double bond, is completed, the reaction mixture is stirred for one hour and then an oxidation mixture consisting of:

| | |
|---|---|
| Chromic acid kg. | 5.4 |
| Water liters | 6.1 |
| Sulfuric acid (conc.) do | 2.5 |
| Glacial acetic acid do | 25.1 | is added slowly under stirring in the course of 6 hours to avoid excessive rise of temperature. The amount of water employed is preferably approximately the minimum required to enable the mixture to dissolve the chromic acid. The reaction mixture is stirred for an additional 3 or 4 hours at room temperature and the bromine taken out by treatment with 5.0 kg. of zinc dust. The reaction mixture is then extracted with an appropriate solvent, such as benzene, ethyl ether, etc. This solution is then thoroughly washed, first with water, then with a solution of alkali containing 10% sodium hydroxide. Upon shaking the extract with the alkali, the acids are removed in the form of their salts which are precipitated as insoluble sodium salts. The alkaline solution as well as the insoluble sodium salts are separated from the extract and worked up separately by filtration. These insoluble sodium salts consist mainly of the difficultly soluble sodium salt of acetoxy Δ 5.6 cholenic acid. The acetoxy Δ 5.6 cholenic acid can be prepared from this material by the method described by Schoenheimer and Berliner (J. Biol. Chem. 115.19, 1935). The yield is 180 gms.

The extract is now washed with water to remove the alkali and then dried and evaporated. The residue is taken up with methyl alcohol. The solution is chilled and the cholesterol acetate separated. 1.0 kg. of acetate is recovered. The methyl alcohol solution is precipitated in the usual way with semicarbazide acetate and after boiling for 1½ hours, the semicarbazone is filtered. It is practically pure dehydroandrosterone acetate semicarbazone. The amount is 0.135 kg.

The mother liquors are now steamed down to half their volume and then left for several hours. The material which crystallizes out is recrystallized after filtration from a mixture of chloroform and alcohol. 0.02 kg. of semicarbazone are obtained which melts at about 230°. This material is mainly the semicarbazone of pregnenolone from which the ketone may be regenerated in the usual way.

*Example 2*

175 gms. of 3-methoxy cholestane are dissolved in 13.5 liters of acetic acid and oxidized during the course of 6 hours with a solution consisting of:

| | |
|---|---|
| Chromic acid | gms 295 |
| Water | cc 295 |
| Sulfuric acid (conc.) | cc 140 |
| Acetic acid | cc 1475 |

After standing for an additional 12 hours, 200 cc. of methyl alcohol are added and the whole poured into water and extracted three times with ether. The ether extracts are combined and washed with 5% alkali, followed by water washings until neutral. The ether solution is distilled and the residue is steam distilled. After taking up in ether and drying, there remains a neutral fraction weighing 20 gms. This is taken up in methyl alcohol and precipitated with semicarbazide in the usual manner. 5 gms. of semicarbazone are obtained, melting at 249° after decomposition at 240°. By treatment with oxalic acid in alcohol the hitherto unknown methyl ether of trans-androsterone is obtained, which melts at 91°.

The chromic acid may be replaced by an equivalent amount of chromylchloride or a bichromate. In the latter case, the amount of sulfuric acid should be sufficient to provide an excess (over that required to liberate the chromic acid) of the order indicated in the above examples.

As indicated above, our improved process employing a mixture of chromic and sulfuric acids is applicable for the oxidation of all those compounds for which the use of chromic acid, or its anhydride, or a bichromate, has heretofore been suggested. The sterols employed as starting materials may be saturated or unsaturated and either substituted or unsubstituted, and include koprosterol, dihydrocholesterol, phytosterol, stigmasterol, ergosterol, sitosterol, cinchol, etc. When an unsaturated sterol is to be oxidized, it may first be hydrogenated to produce the saturated compounds; or the double bond may be protected in known manner, as by halogenation, or the addition of a hydro-halide, prior to the oxidation, the double bond being restored if desired in known manner by elimination of the added halogen or hydrogen and halogen atoms. Thus halogen may be removed with zinc dust, sodium iodide, etc., while hydrohalic acid may be removed with alkaline agents, such as pyridine, alkali metal hydroxides and acetates, etc.

Where the sterolic compound contains a hydroxy group, such group is preferably protected by being converted into a group, such as an O-acyl, O-alkyl, O-aryl, ethoxy or halogen group, or other group which by hydrolysis can be reconverted to the hydroxy group. Thus the hydroxy group may be temporarily replaced by O-acetyl, as in Example 1, or by O-benzoyl, O-succinyl, O-phthalyl, O-methyl (as in Example 2), O-ethyl, chlorine, etc.

The expression "sterolic compound" as used in this specification and in the appended claims is to be understood to mean a compound of the cyclopentano dimethyl (10,13) polyhydro phenanthrene series having a side chain attached to the 17-carbon.

Variations from the proportions, times of reaction, temperatures, etc. indicated hereinabove may be resorted to by those skilled in the art within the scope of the appended claims without departing from the spirit of the invention.

We claim:

1. In a method of oxidizing a sterolic compound which is saturated in the nucleus to split off at least a portion of the side chain thereof while leaving the cyclopentano phenanthrene nucleus unbroken, the step which comprises subjecting such compound to the action of an oxidizing compound of chromium in the presence of sulfuric acid.

2. In a method of oxidizing a nuclearly saturated cyclopentano dimethyl (10,13) polyhydro phenanthrene compound having a side chain in the 17-position to split off at least part of such side chain, the step which comprises subjecting the compound to the action of an oxidizing compound of chromium capable of splitting off at least part of the side chain in the presence of sulfuric acid and without the application of external heat.

3. The method of oxidizing a sterol comprising reacting the compound with a reagent capable of replacing the hydroxyl group with a group which can be replaced by the hydroxyl group, and subjecting the resulting compound in the nuclearly saturated condition to the action of an oxidizing compound of chromium capable of splitting off the side chain, in the presence of sulfuric acid to split the sterol at the side chain.

4. The method of oxidizing nuclearly unsaturated sterols, which comprises saturating the nucleus of the compound and reacting the product with a reagent capable of replacing the OH group with a group which by hydrolysis can be substituted by the OH group, in any order, and then subjecting the product so obtained to a mixture of chromic and sulfuric acids to split it at the side chain.

5. The method of oxidizing cholesterol, which comprises converting the hydroxyl group into a group which on hydrolysis is replaced by the hydroxyl group and saturating the double bond of the compound, in either order, and then oxidizing the product so obtained with a mixture of chromic and sulfuric acids to split the compound at the side chain.

6. The method of oxidizing cholesterol, which comprises acylating and saturating the compound, in either order, and then oxidizing the product so obtained with a mixture of chromic and sulfuric acids in the presence of an inert solvent to split the compound at the side chain.

7. The method of oxidizing cholesterol, which comprises converting the hydroxyl group into a group which on hydrolysis is replaced by the hydroxyl group and saturating the double bond by the addition of substituents which can be removed to restore the double bond, in either order, and then oxidizing the product so obtained with a mixture of chromic and sulfuric acids to split the compound at the side chain.

8. The method of oxidizing cholesterol, which comprises converting the hydroxyl group into a group which on hydrolysis is replaced by the hydroxyl group and hydrogenating the double bond, in either order, and then oxidizing the product so obtained with a mixture of chromic and sulfuric acids to split the compound at the side chain.

9. The method of oxidizing cholesterol, which comprises converting the hydroxyl group into a group which on hydrolysis is replaced by the hydroxyl group and adding halogen to the compound to saturate the double bond, in either order, and then oxidizing the product so obtained with a mixture of chromic and sulfuric acids to split the compound at the side chain.

10. The method of oxidizing cholesterol, which comprises converting the hydroxyl group into a group which on hydrolysis is replaced by the hydroxyl group and adding hydrogen halide to the compound to saturate the double bond, in either order, and then oxidizing the product so obtained with a mixture of chromic and sulfuric acids to split the compound at the side chain.

11. The method of oxidizing cholesterol, which comprises reacting the same with an acylating agent, halogenating the acyl compound to saturate the same, reacting the resulting product with a mixture of chromic and sulfuric acids, removing the halogen to restore the double bond, treating the mixture of oxidation products with an alkaline compound to cause precipitation of the salt of acyloxy Δ 5.6 cholenic acid, separating the precipitate, treating the soluble substances with a keto reagent, and isolating dehydroandrosterone and pregnenolone from the resulting precipitate.

12. The method according to claim 1, including the step of separating the acidic from the ketonic reaction products.

13. The method according to claim 1, including the step of converting the acidic component of the reaction product in an organic solvent into salts insoluble in such solvent, and isolating the ketonic material.

14. The method of producing androsterone compounds which comprises oxidizing an ether of 3-hydroxy cholestane with a mixture of chromic and sulfuric acids, and isolating the ether of trans-androsterone so obtained.

15. The method of producing androsterone compounds, which comprises oxidizing 3-methoxy cholestane with a mixture of chromic and sulfuric acids, and isolating the methyl ether of trans-androsterone from the reaction mixture.

16. The method of producing androsterone compounds, which comprises oxidizing 3-methoxy cholestane with a mixture of chromic and sulfuric acids, extracting the reaction mixture with an organic solvent, washing the solution with alkali, evaporating the solution, distilling the residue with steam, and extracting the methyl ether of trans-androsterone.

17. The method according to claim 1, wherein the amount of sulfuric acid (concentrated) is of the order of 2.5 liters for about 5.4 kg. of chromic acid.

18. In a method of oxidizing a sterolic compound which is saturated in the nucleus to split off at least a portion of the side chain thereof while leaving the cyclopentano phenanthrene nucleus unbroken, the step which comprises subjecting such compound to the action of an oxidizing compound of chromium in the presence of sulfuric acid, acetic acid, and water.

19. In a method of oxidizing a sterolic compound which is saturated in the nucleus to split off at least a portion of the side chain thereof while leaving the cyclopentano phenanthrene nucleus unbroken, the step which comprises subjecting such compound at room temperature to the action of an oxidizing compound of chromium in the presence of sulfuric acid, acetic acid, and the minimum amount of water capable of causing the mixture to dissolve the chromium compound.

20. The method of producing degradation products of sterols which comprises treating a nuclearly saturated sterol, whose hydroxyl group has been replaced by a group which is more resistant to oxidation, with a mixture of chromic, sulfuric and acetic acids at room temperature, until compounds are produced having the sterolic nucleus but at most only part of the original carbon side chain.

21. A 3-ether of trans-androsterone.

22. The 3-methyl ether of trans-androsterone.

ERWIN SCHWENK.
BRADLEY WHITMAN.